United States Patent [19]

Wales et al.

[11] Patent Number: 4,605,083

[45] Date of Patent: * Aug. 12, 1986

[54] METHOD AND APPARATUS FOR WEIGHING MATERIAL

[75] Inventors: R. Langdon Wales, Lincoln; H. W. Crowley, Newton, both of Mass.

[73] Assignee: Automation, Inc., Needham, Mass.

[*] Notice: The portion of the term of this patent subsequent to Oct. 30, 2001 has been disclaimed.

[21] Appl. No.: 449,390

[22] Filed: Dec. 13, 1982

[51] Int. Cl.$^4$ .................. G01G 13/02; G01G 19/00
[52] U.S. Cl. ..................................... 177/122; 177/200
[58] Field of Search ..................... 177/70, 17, 15, 61, 177/200, 122, 120, 121; 198/504, 577, 505; 414/294, 296

[56] References Cited

U.S. PATENT DOCUMENTS

| | | | |
|---|---|---|---|
| 1,750,244 | 3/1930 | Robb | 177/70 |
| 1,835,104 | 12/1931 | Watson | 177/70 |
| 2,769,641 | 6/1956 | Brown | 198/577 |
| 3,716,706 | 2/1973 | Gray | 177/200 |
| 4,479,559 | 10/1984 | Wales | 177/1 |

Primary Examiner—E. A. Goldberg
Assistant Examiner—Mark A. Reinhart
Attorney, Agent, or Firm—Wolf, Greenfield & Sacks

[57] ABSTRACT

A method and apparatus for separately weighing, by means of a common scale, contributions of material from multiple streams, such materials typically being printed papers, such as from a printing press. Material that is to be weighed, which is typically waste material, is loaded into receptacles or the like for temporary storage thereof and is subsequently and sequentially released into a storage bin or the like associated with the common scale. An increase in measured weight associated with each respective material release or discharge is then determined. From each weight increment associated with one of the multiple streams, is added to provide a total count corresponding to weight and associated with each, one of the individual streams of the multiple streams of material. In this way, separate count totals are maintained and continuously updated for a plurality of different corresponding deliveries but using a common scale and associated storage bin or container.

16 Claims, 6 Drawing Figures

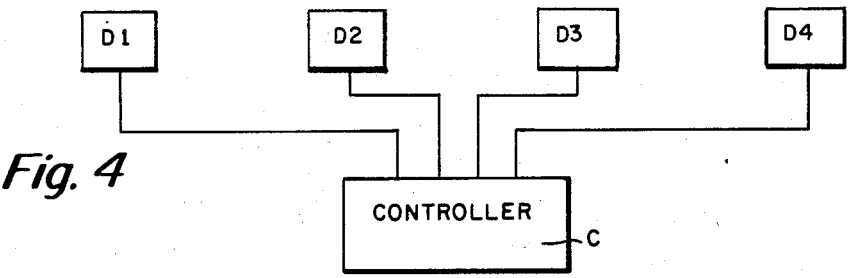
Fig. 4
Fig. 5
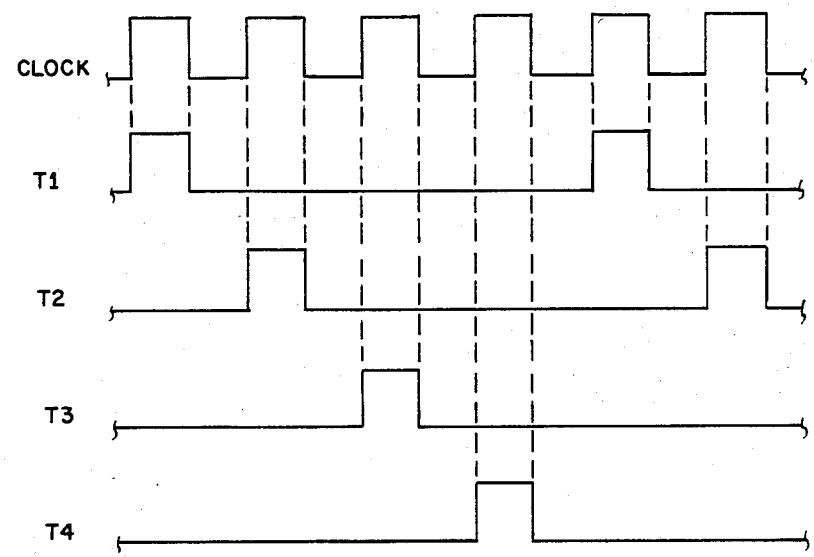
Fig. 6
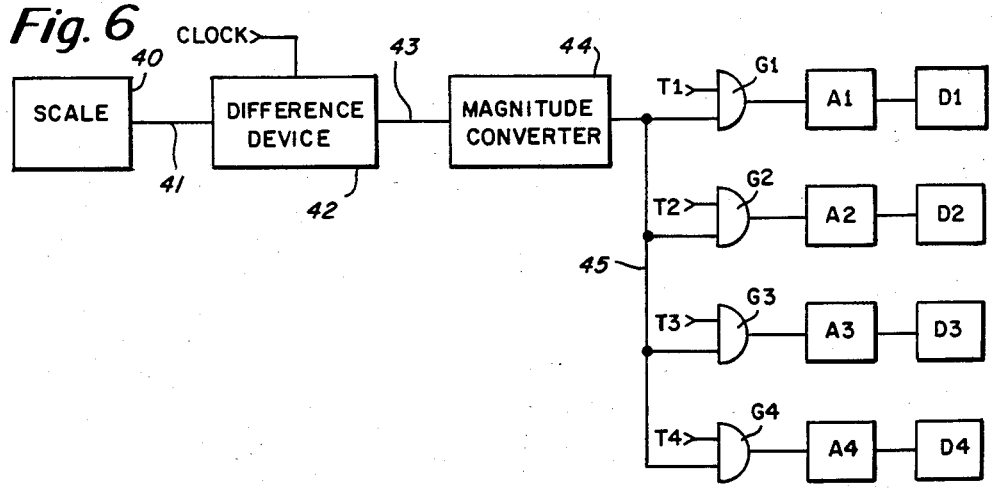

METHOD AND APPARATUS FOR WEIGHING MATERIAL

BACKGROUND OF THE INVENTION

The present invention relates very generally to a method and apparatus for weighing material, and pertains, more particularly, to a method and associated apparatus for separately weighing contributions of material from multiple streams thereof and carrying out this separate weighing using a common scale.

In the printing process, and in other production processes, particularly where a continuous supply of material, such as paper from a roll is fed through a printing press, it is desired to maintain an accurate count of the products from the production process. As long as all of the products from the process are usable, in the case of the printing process, the count is equal to the number of revolutions of the printing press. However, it typically happens that in the course of carrying out the process, some of the products or materials are spoiled for one reason or the other and must be discarded. Thus, the total count of press impressions is no longer a measure of the total count of good product produced. It is and has been thus necessary either to count the good product independently, or to maintain an accurate accounting of the number of products discarded, so that this number can be subtracted from the known total count to obtain an accurate figure for the net "good" count.

A common method for counting "good" products or materials from a printing press is with the use of two counters. One of these is a gross counter which counts every revolution of the press whether a "good" product is produced or whether the product is to be discarded. The other counter is a net counter. The net counter can be turned on and off by the press operator, in accordance with whether he thinks the copies being made are acceptable or not. The problem with this technique is that it is subject to error as the operator may be unaware that the press has started to produce copies that should be discarded and therefore the operator may fail to set the counter. It is typical that when the defect is discovered, that the operator may estimate the number in order to prevent the necessity of restarting the net counter when good copies are again produced.

To overcome the aforementioned problem, ratio scales have been employed to measure the number of signatures (impressions or sheets in the case of paper) discarded. The number so determined is subtracted from the gross count to obtain a more accurate net count. Alternatively, when the number of signatures discarded is determined from the ratio scale, this may be added to the required number of "good" counts in order to determine the gross counter reading at which the press is to be stopped. Although this technique is somewhat of an improvement, it is still subject to human error because of the bookkeeping involved. Also, because one printing press typically produces up to four different products at one time, the bookkeeping becomes particularly complicated. Also, the bookkeeping or record keeping is complicated by virtue of the fact that usually only one scale is used to measure the waste paper from several deliveries of the same press.

Another technique that is employed involves the use of separate scales for each product. However, this technique requires substantial floor space and is also very expensive to implement. Still another common technique is to employ one scale but with multiple operator buttons such as four operator buttons to allow the press man to enter which printing stream the last weight came from. This technique require too much operator involvement and slows the process since several people may be depositing sheets at one time. A variation of these techniques uses a small scale or scales to weight the individual bundles before they are deposited in the central bin. This variation has all the above-mentioned problems and further requires an extra step.

Accordingly, it is an object of the present invention to provide a method and associated apparatus for separately weighing contributions of material, typically in sheet form from a printing press, from multiple streams thereof, and providing this weighing with a common scale. Another object of this invention is to provide an apparatus for registering accurate "good" counts from each of multiple press deliveries using a common scale.

A further object of the present invention is to provide an improved method and apparatus for weighing material in accordance with the objects and in which the method is carried out without the need for manual record keeping or manual entry of data.

Still another object of the present invention is to provide an improved method and associated apparatus for weighing materials from multiple streams with a common scale and wherein the apparatus is safe to operate, jam proof, accurate in operation, and easy to maintain.

To accomplish the foregoing and other objects of this invention there is provided in accordance with one aspect thereof, apparatus for weighing material from multiple streams with a common scale, which apparatus comprises a plurality of separate means, each for temporary storage of a quantity of said material that is to be weighed. In the embodiment described herein, the material may be in the form of paper used in a printing process and the weighing is of spoiled product. The apparatus of the present invention is for use with a single common scale and yet provides for a total count of waste material for each of the plurality of storage means. In addition to the plurality of separate means for this temporary storage of the material and the common scale means, the apparatus also comprises means for sequentially releasing the material from the respective separate means for storing so as to enable delivery thereof to the common scale means. This is typically carried out with the use of a common storage bin associated with the scale means. Electronic means is used for control and includes means responsive to the scale reading for sensing increments in scale weight for each respective release of material. The electronic circuitry has to determine with which of the deliveries the weight increment corresponds. Thus, there is provided a means for totaling the respectively sensed weight increments to provide a plurality of separate counts corresponding to weight and associated with each of the respective means for storage. In accordance with the invention the storage means may comprise a hopper and the means for releasing may be constructed in combination with the storage means in one of two preferred forms described herein. This may comprise either a metered discharge which may be in the form of a gate cover or moving aperture arranged to open at the time of discharge and to be closed at all other times. The delayed transport technique may comprise a conveyor used to carry the material towards the discharge opening. When the conveyor is operated it will discharge the material upon it into the waste bin below. When it is stopped, it will store material for the next discharge cycle. The means for sensing increments in scale weight may comprise a difference means or a difference circuit having an output count or magnitude corresponding to the difference in weight between a present scale weight and the next scale weight after operation of the means for releasing. Preferably, means are provided for converting the weight factor sensed to a count that corresponds to the number of pieces of material released in a batch. The means for totalling substantially adds counts corresponding to weight and displays a count indicating total pieces weighed per stream.

In accordance with another aspect of the present invention, there is provided a method of weighing material from multiple streams with a common scale. This method comprises the steps of separately and temporarily storing a quantity of the material that is to be weighed from each respective stream and sequentially and mutually exclusively releasing the material from its temporary storage to the scale. The next step is that of sequentially sensing increments in scale weight for each respective release of material. Finally, each of these increments corresponding to a predetermined stream is added so as to accumulate sensed weight increments associated with each respective stream.

BRIEF DESCRIPTION OF THE DRAWINGS

Numerous other objects, features and advantages of the invention should now become apparent upon a reading of the following detailed description taken in conjunction with the accompanying drawing, in which:

FIG. 4 is a block diagram associated with the present invention showing the discharge or release devices which total four in associated controller for these devices;

FIG. 5 is a waveform associated with the electronics of the invention in FIGS. 4 and 6; and FIG. 6 is a schematic block diagram showing the scale weight sensing technique and associated display.

DETAILED DESCRIPTION

Figure 1:
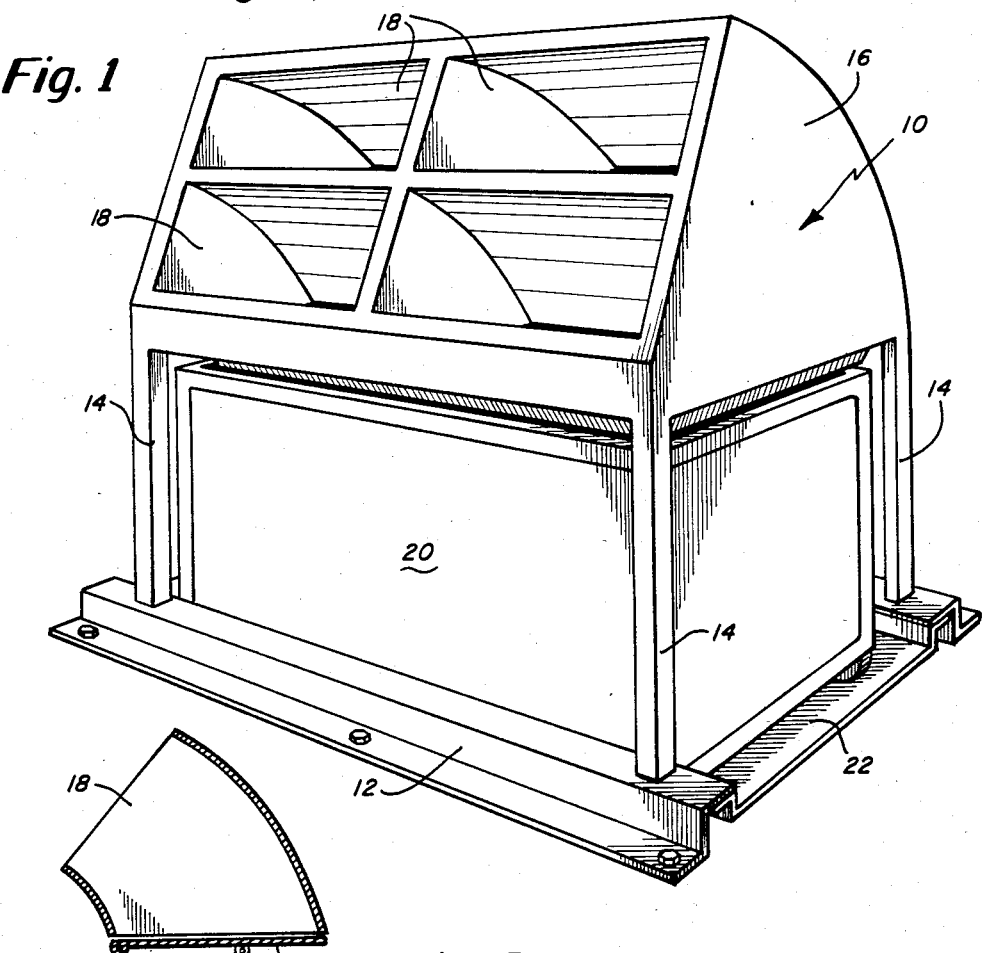
FIG. 1 is a perspective view of a portion of the apparatus of the present invention showing the separate storage hoppers, the waste bin, and associated scale.

Referring now to the drawing, there is shown in FIG. 1, a perspective view of a part of the apparatus of the present invention including framework 10 including a base 12, legs 14, and a top section 16 which comprises means defining a plurality of four hoppers 18. In the embodiment illustrated in FIG. 1 there are four such hoppers that are employed. The framework 10 is disposed about the waste bin 20 which is adapted to contain waste paper discarged in a printing press operation. The waste bin 20 rests upon a scale 22 only a portion of which is actually shown in the perspective view of FIG. 1. The scale 22 may be of conventional design adapted to have some type of a digital readout such as in binary form indicative of weight.

The apparatus disclosed in FIG. 1 may be used with a printing press which typically has four conveyors upon which four different products may be delivered. The good products are allowed to go to stackers or bundlers not specifically described herein and are ultimately stacked on skids for future use or processing. The rejected products are lifted off of the delivery conveyors and placed in the apparatus depicted in FIG. 1. The apparatus in FIG. 1 as indicated previously, has four entry points or hoppers. There is an operator assigned to each delivery of the press and thus each operator is in turn assigned a hopper into which is deposited any waste that occurs at the assigned delivery point.

The apparatus depicted in FIG. 1 may be refered to as a channelizer in that the waste material or waste product is channeled into the waste bin 20 by means of the separate and discreet hoppers. However, the hoppers are not direct conduits into the waste bin but rather, each is furnished with a temporary storage means capable of holding a limited quantity of waste paper such as one or two armfuls.

Figure 2:
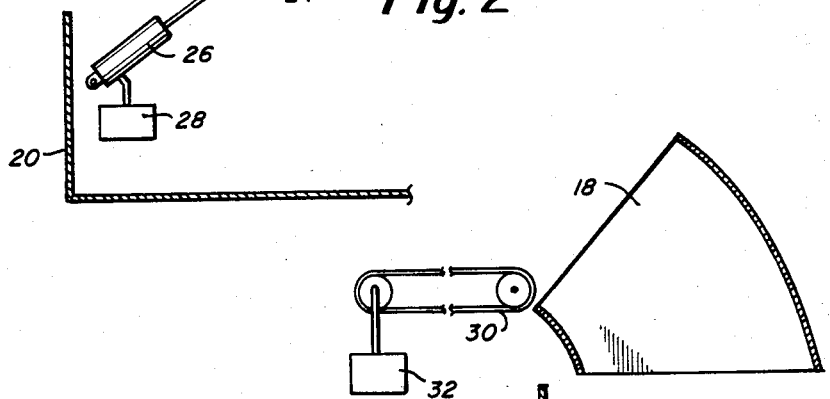
FIG. 2 is a fragmentary cross-sectional view of one embodiment of the apparatus illustrating the meter discharge technique.
Figure 3:
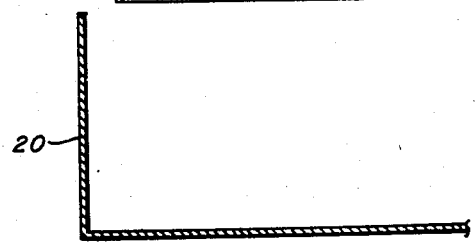
FIG. 3 is a fragmentary cross-sectional view of one embodiment of the apparatus illustrating a delayed transport technique.

FIGS. 2 and 3 schematically illustrate two different apparatus for causing the product or material release or discharge. FIG. 2 shows what may be referred to as a metered discharge technique while FIG. 3 illustrates a delayed transport technique. Thus, there is illustrated in FIG. 2 the waste bin 20 and one of the hoppers 18. It is noted that the hopper 18 has associated therewith, a gate 24 which has attached thereto, a piston 26 which may be selectively operated from actuating device 28. The piston and actuating device may be of conventional design. Alternatively, the gate 24 may be substituted by some type of a moving apertured plate arranged to open at the time of discharge and to be closed at all other times.

The metered discharge type of apparatus illustrated in FIG. 2 is quite compact but requires attention as to safety and jamming. In this technique, the hopper may also be provided in an alternate embodiment with a pair of pivoting hopper doors in place of the gate 24. When these doors are closed, they serve as the bottom of the receptacle and hold the material that is being stored. They can be opened by use of electric motors, cylinders as illustrated in FIG. 2 or by other means. When they are open, this allows the material to drop into the waste bin therebelow. The reclosure may be accomplished in a way that would not injure a person nor trap material. For example, the actuating means for the doors may have two levels of operating force. When the doors are closed from a wide open position, a low level of actuating force is employed so that if a hand is introduced, the doors stop moving without applying sufficient force to injure the hand. Sensors determine whether the doors have closed all the way and if the doors fail to close all the way with the low actuating force level, they are reopened to release the trapped material or object. They are then reclosed with the low actuating force. Once the sensor signals that the doors have closed all the way, then a high level of operating force is applied to hold them shut so that material deposited upon them does not force them open.

To provide this dual force level of operation, there may be provided a powering of the shutters or doors with an electric motor that is operated at reduced voltage for closing and full voltage for locking. Alternatively there could be provided a mechanism having a low mechanical advantage that shifts to higher mechanical advantage when it has passed a certain point.

In FIG. 3 there is illustrated the other alternate embodiment wherein there is provided as the delayed transport a conveyor mechanism 30 having associated therewith a control drive 32 schematically depicted in FIG. 3. In the delayed transport technique of the invention as illustrated in FIG. 3, a conveyor is used, such as the conveyor 30, to carry the material towards the discharge opening or hopper 18 illustrated in FIG. 3. When the conveyor is operated, it discharges the material that is on it into the waste bin below. When it is stopped under control of the drive 32, the conveyor functions as a means for storing material for the next discharge cycle. If the stopping of the conveyor is followed by a brief period of reverse motion, as preferred, then any material near the drop off point that might otherwise fall into the waste bin at the wrong time, is moved back by this reverse action, to a stable storage position. Also, the conveyor technique of this invention is readily adapted to be combined with the use of conveyors for long distance transport so that waste discard points may be placed conveniently close to the respective press deliveries with the same conveyor serving also to move the material to the waste bin and to perform the sequential metering function described herein. The press can be controlled to transfer waste to the conveyors automatically in response to signals such as a roll change. This greatly reduces operator involvement.

In selecting the apparatus described in either FIGS. 2 or 3, there are some criteria that should be met such as the fact that the apparatus should be safe to operate with no injury to anyone inserting a hand into the receptacle at any time. The aforementioned dual force operation provides this safety. Also, the apparatus is jam proof and must not be subject to jamming from caught pieces of paper. Also, the operation is such that only one hopper is discharging at a time. At no point during the release and weighing of waste from one receptacle should waste from another receptacle be released. Also, the storage mechanism must be capable of readily receiving waste thrown in during the closure of the receptacle. It is important that papers not be left hanging from the receptacle opening where they could be knocked off during the removal or replacement of the waste bin. It is also desired that the waste bin replacement be accomplished relatively simply. The control for the release is primarily electronic, although it could also be hydraulic and with electronic control it is relatively easy to assure that the operation is mutually exclusive; that is, that only one release occurs at any one time.

FIG. 4 is a simple illustration of the discharge devices identified in FIG. 4 as devices D1, D2, D3 and D4. It is noted that these all couple to a controller C which may include a microprocessor or the like. FIG. 4 simply illustrates that the controller C is adapted to send release signals on the intercoupling lines to the respective devices D1-D4. FIG. 4 illustrates the manner in which these signals are sent. In FIG. 5 there is a clock signal and also four timing signals referred to therein as signals T1, T2, T3, and T4. It is noted that the signals T1-T4 are sequentially spaced. This means that only one of the discharge devices is operated at a time and in accordance with the respective signals. Thus, the timing signal T1 is sent from the controller C to the device D1 to operate it during its time slot T1 which in the illustrative example of FIG. 5, is when the signal is at its pulsed high level form. Thereafter, the device D2 is operated for discharging or releasing under control of the signal T2 and the other two devices are operated sequentially in the same order by the subsequent timing signals.

Now, FIG. 6 shows further control electronics in accordance with the invention. FIG. 6 illustrates the scale 40 which has an output on line 41 representative of the weight on the scale. Digital scales are well known and the output signal on line 41 may in fact be a multi-line signal representative of a count corresponding to weight. This signal is coupled to the difference device 42 which again may be a conventional device in the form of a subtractor or the like device having a clock input and also storage capability. The different device 42 simply stores an indication of the present count and then compares that with a subsequent count under control of the clock. This thus provides an output at the output line 43 from the device 42 that is representative of the increment in weight in the form of an increment count corresponding to the weight added each time that a discharge or release of product occurs from the hopper into the waste bin. In the embodiment of FIG. 6 the device 42 does not distinguish to the origin of the release, but simply provides a difference signal that is coupled by way of line 42 through a magnitude converter 44. The magnitude converter 44 simply provides for any necessary conversion from weight to a count representative of the number of signatures (impressions or sheets or paper). The output signal from the converter 44 couples by way of line 45 to a series of gates G1, G2, G3, and G4. These are represented in FIG. 6 as AND gates that also receive the respective time signals T1, T2, T3 and T4. Thus, the demarcation of weight increment is carried out by the gates which are mutually exclusively enabled by the respective timing signals. The output of the gates G1-G4 couple to the adders A1-A4 for providing total respective counts to total signatures per stream or separate hopper. The four adders A1-A4 then are shown coupling to the four display devices D1-D4.

In operation, under the control of the microcomputer, the contents of the several receptacles are sequentially released into the waste bin below under control of the signals T1-T4 and the increase in weight associated with each discharge is determined by the circuitry of FIG. 6. These weight increases are each converted by the magnitude converter 44 as mentioned previously to the corresponding number of signatures and the additional timing associated with gates G1-G4 provide for cumulative adding to provide respective waste count totals. Thus, separate waste count totals may be maintained for a plurality of deliveries using a common scale and associated waste container.

By further way of example, during the time T1 when the discharge device D1 is being released, it is noted that the gate G1 is also enabled. Assuming that no race problems exist, then it is only gate G1 that is enabled during that time period and thus any weight increment sensed by the circuitry of FIG. 6 is only added to the adder A1 associated with that time slot. When this addition takes place, the total waste count for that first stream is displayed on the display device D1. In the sequencing, the other totals are also cumulatively added in the same manner.

Having described a limited number of embodiments of the present invention, it should now be apparent to those skilled in the art that numerous other embodiments are contemplated as falling within the scope of this invention.

What is claimed is:

1. Apparatus for weighing material from multiple streams with a common scale, comprising;

a plurality of separate means for the temporary storage of a quantity of said material that is to be weighed, common weighing means, means for sequentially releasing said material from said respective separate means for storing to said common weighing means, means responsive to said weighing means for sensing increments in weight for each respective release of material, and means for totaling the respectively sensed weight increments to provide a plurality of separate counts corresponding to weight and associated with each respective means for storage.

2. Apparatus as set forth in claim 1 wherein said plurality of separate means comprises hoppers.

3. Apparatus as set forth in claim 1 wherein said plurality of separate means comprises conveyor means.

4. Apparatus as set forth in claim 3 wherein said means for releasing comprises means for controlling the conveyor means to advance material to the weighing means.

5. Apparatus as set forth in claim 4 wherein the means for controlling the conveyor means provides for advancement to deliver material to the weighing means followed by reversal to assure that no material mistakenly falls to the weighing.

6. Apparatus as set forth in claim 1 including a common storage bin over said weighing means.

7. Apparatus as set forth in claim 1 wherein said means for releasing includes a release gate for opening said means for temporary storage.

8. Apparatus as set forth in claim 7 wherein said release gate comprises a dual force gate operated at partial capacity for closing and full capacity for locking.

9. Apparatus as set forth in claim 1 wherein said means for sensing increments in weighing weight comprises a difference means having an output count or magnitude corresponding to the difference in weight between a present weighing weight and the next weighing weight after operation of said means for releasing.

10. Apparatus as set forth in claim 9 including means for converting the weight factor sensed to a count that may correspond to the number of pieces of material released in a batch.

11. Apparatus as set forth in claim 10 werein said means for totaling adds counts corresponding to weight and displays a count indicating total pieces weighed per stream.

12. A method of weighing material from multiple streams with a common scale, comprising;

separately and temporarily storing a quantity of said material that is to be weighed from each respective stream, sequentially and mutually exclusively releasing said material from said temporary storage to said scale, sequentially sensing increments in scale weight for each respective release of material, and adding respectively sensed weight increments associated with each respective stream.

13. A method of weighing material as set forth in claim 12 further comprising comparing the sensed weight to the weight of a known sample to determine a piece count.

14. A method of weighing material as set forth in claim 13 further comprising subtracting the piece count from a gross count to yield an accurate net count.

15. A method of weighing material as set forth in claim 12 wherein the material weighed is waste material.

16. A method of weighing material from multiple streams with a common scale, comprising;

delivering a quantity of said material that is to be weighed from each respective stream, sensing increments in scale weight from each respective delivery, and adding sensed weight increments associated with each respective stream to provide separate counts corresponding to weight from each stream.

* * * * *